Feb. 6, 1923.

L. MARTINO

BOILER TUBE STOPPER

FILED APR. 1, 1921

1,444,351

INVENTOR:
Letterio Martino

By  *[signature]*
ATTORNEYS

Patented Feb. 6, 1923.

1,444,351

UNITED STATES PATENT OFFICE.

LETTERIO MARTINO, OF EVERETT, MASSACHUSETTS.

BOILER-TUBE STOPPER.

Application filed April 1, 1921. Serial No. 457,683.

*To all whom it may concern:*

Be it known that I, LETTERIO MARTINO, of Everett, in the county of Middlesex and State of Massachusetts, a citizen of the United States, have invented a new and useful Improvement in Boiler-Tube Stoppers, of which the following is a specification.

My invention relates to an improvement in boiler tube stoppers which reduces the number of parts usual in devices of this kind and results in a device which is efficient, simple, cheap to make and capable of application by one man without assistance.

My invention will be understood by reference to the drawings in which it is shown in its preferred form.

Figure 1:
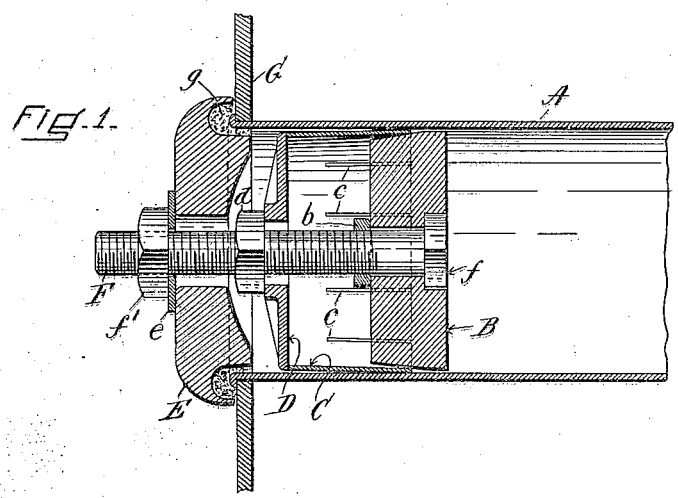
Figure 2:
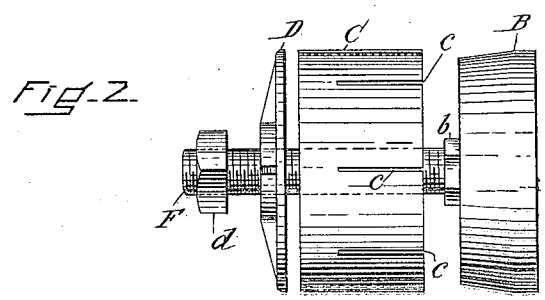

Figure 1 is a longitudinal section of a portion of a tube showing the stopper in place, and Fig. 2 is a side elevation of the stopper, the individual parts being separated from each other.

A is the boiler tube which is set into and attached to the boiler plate G in the ordinary way. B is a conical or wedge-shaped piece, the largest diameter of this piece being such as to make an easy sliding fit with the interior of the tube. The piece B has a hole through it through which passes the bolt F, the under or inner side of the wedge-piece B having preferably a square opening or other means to receive the head $f$ of the bolt and keep it from turning. $b$ is a nut which screws down upon the bolt F and thus attaches the bolt and the part B together. C is an expansible sleeve having slots therein $c$. The sleeve is preferably made slightly smaller in diameter than the tube in which the device is used so that it may be easily slipped in and out from the tube, but the slots $c$ allow its inner end to be expanded by the expanding member or wedge-piece B into tight engagement with the inner wall of the tube. D is a centering plate which as shown is separate from the sleeve C and is of substantially equal diameter therewith and which is held thereto by means of the nut $b$ on the bolt F, the bolt thus forming a clamping member to clamp these parts together. The centering plate has an opening through its middle through which the bolt F passes and a nut $d$ is preferably used where the sleeve and the plate are not integral, to hold the plate against the end of the sleeve. E is a cap which is of larger diameter than the tube so that it overlaps it and engages the boiler plate G. It is preferably provided with a groove on its under or inner surface which may be filled with suitable packing $g$ to prevent leakage of gases from the tube. This cap has an opening through the centre for the bolt F and a nut $f^1$ on the bolt F clamps the parts together, $e$ being a packing washer to guard against the escape of gases around the bolt.

In practice, the plug comprising the pieces B, C, D and F being assembled and placed within the tube A, the nut $d$ is then screwed up tightly to clamp the parts together and to draw the wedge-piece B within the sleeve and expand the sleeve to force it against and make it hug the interior of the tube A as tightly as possible. The cap E being then put in place, the nut $f^1$ is screwed down on the bolt F so as to hold the plug in place in the tube and also, because of the packing $g$ and washer $e$, close tightly the joint so that no gas will escape. For this purpose the nut $f^1$ should best be larger than the opening in the cap E.

While there have been other stoppers made somewhat along the lines of my device, the stoppers in general use extend clear through the tube so that they require a man and a helper to put them in place. My device requires the services of but one man because it does not extend through the tube. It is small and compact, comprising but few pieces, and can be readily and quickly put into place. Moreover, because it is made of so few pieces and is so simple and compact it is very inexpensive and handy.

It is evident that its features may be embodied in other ways than that shown as will occur to one skilled in the art.

What I claim as my invention is:—

1. In a device of the kind described, a plug for a tube comprising a wedge-piece, a slotted sleeve adapted to engage the wedge surface of said wedge-piece, means for adjusting said wedge-piece and said sleeve with relation to each other comprising a plate adapted to engage one end of said sleeve, a bolt, and a nut on said bolt adapted to engage said plate within the tube and force said sleeve onto said wedge-piece.

2. A boiler tube stopper comprising a wedge-piece, a sleeve in engagement with the conical surface of said wedge-piece having slots therein whereby it may be expanded by said wedge-piece, a plate adapted to engage the other end of said sleeve, a bolt passing through said wedge-piece and said plate, and means adapted to lie within the tube for forcing said plate toward said wedge-piece whereby said sleeve will be expanded, a cap of larger diameter than said wedge-piece and adapted to overlap the edges of a boiler tube, and means for holding said cap and said wedge-piece together.

LETTERIO MARTINO.